United States Patent
Kim et al.

(10) Patent No.: US 10,591,911 B2
(45) Date of Patent: Mar. 17, 2020

(54) APPARATUS AND METHOD FOR CONTROLLING DRONE FORMATION

(71) Applicant: Korea University Research and Business Foundation, Seoul (KR)

(72) Inventors: Hwang Nam Kim, Seoul (KR); Woong Gyu La, Gyeonggi-do (KR); Seung Ho Yoo, Seoul (KR); Seong Joon Park, Seoul (KR); Joon Yeop Lee, Seoul (KR)

(73) Assignee: KOREA UNIVERSITY RESEARCH AND BUSINESS FOUNDATION, Seoul (KR)

( * ) Notice: Subject to any disclaimer, the term of this patent is extended or adjusted under 35 U.S.C. 154(b) by 0 days.

(21) Appl. No.: 15/840,934

(22) Filed: Dec. 13, 2017

(65) Prior Publication Data

US 2018/0373240 A1   Dec. 27, 2018

(30) Foreign Application Priority Data

Jun. 22, 2017   (KR) .......................... 10-2017-0079105

(51) Int. Cl.
*G05D 1/02* (2020.01)
*G05D 1/10* (2006.01)
*B64C 39/02* (2006.01)
*G05D 1/00* (2006.01)

(52) U.S. Cl.
CPC ........... *G05D 1/0027* (2013.01); *G05D 1/104* (2013.01); *B64C 39/024* (2013.01); *B64C 2201/146* (2013.01)

(58) Field of Classification Search
CPC ............ B64C 2201/146; B64C 39/024; G05D 1/0027; G05D 1/104
See application file for complete search history.

(56) References Cited

U.S. PATENT DOCUMENTS

| | | | |
|---|---|---|---|
| 9,415,869 B1* | 8/2016 | Chan | B64C 39/024 |
| 9,645,581 B1* | 5/2017 | Yang | G05D 1/101 |
| 9,671,791 B1* | 6/2017 | Paczan | B64C 39/024 |
| 9,773,418 B1* | 9/2017 | Smith | G08G 5/0043 |
| 9,824,592 B2* | 11/2017 | Anandayuvaraj | G08G 5/0039 |
| 9,847,032 B2* | 12/2017 | Postrel | B64C 39/024 |
| 9,927,807 B1* | 3/2018 | Ganjoo | H04W 76/10 |
| 10,025,315 B2* | 7/2018 | Klinger | G05D 1/0214 |
| 10,170,006 B2* | 1/2019 | Kline | G08G 5/0034 |

(Continued)

FOREIGN PATENT DOCUMENTS

| | | |
|---|---|---|
| KR | 10-2012-0054902 A | 5/2012 |
| KR | 10-2015-0129600 A | 11/2015 |

(Continued)

*Primary Examiner* — Tyler J Lee
(74) *Attorney, Agent, or Firm* — Hauptman Ham, LLP

(57) ABSTRACT

A drone formation control apparatus for controlling a plurality of drones included in a drone formation includes: an input unit which receives a drone control command which is a command for controlling the plurality of drones together; a movement command generating unit which generates a drone movement command which is a command to move the plurality of drones to a specific destination, based on the drone control command; and a movement command transmitting unit which transmits the drone movement command to at least one drone of the plurality of drones.

13 Claims, 4 Drawing Sheets

(56) References Cited

U.S. PATENT DOCUMENTS

| | | | |
|---|---|---|---|
| 10,303,415 B1* | 5/2019 | Ananthanarayanan | G06F 3/1446 |
| 2009/0219393 A1* | 9/2009 | Vian | G07C 5/008 |
| | | | 348/144 |
| 2015/0120126 A1* | 4/2015 | So | G01C 23/00 |
| | | | 701/26 |
| 2015/0301529 A1* | 10/2015 | Pillai | B64C 39/024 |
| | | | 701/2 |
| 2015/0327136 A1* | 11/2015 | Kim | H04W 36/08 |
| | | | 370/331 |
| 2015/0338855 A1* | 11/2015 | Stark | B64C 39/024 |
| | | | 701/3 |
| 2016/0086494 A1* | 3/2016 | Anandayuvaraj | G08G 5/0039 |
| | | | 701/3 |
| 2016/0144734 A1* | 5/2016 | Wang | B60L 11/1822 |
| | | | 701/17 |
| 2016/0340006 A1* | 11/2016 | Tang | B63C 9/01 |
| 2017/0023947 A1* | 1/2017 | McMillion | B64D 1/22 |
| 2017/0181117 A1* | 6/2017 | Dowlatkhah | H04W 64/003 |
| 2017/0227968 A1* | 8/2017 | Klinger | G05D 1/0214 |
| 2017/0242431 A1* | 8/2017 | Dowlatkhah | G08C 17/02 |
| 2018/0040249 A1* | 2/2018 | Kuhara | G05D 1/101 |
| 2018/0047295 A1* | 2/2018 | Ricci | G05D 1/104 |
| 2018/0061251 A1* | 3/2018 | Venkatraman | B64C 39/024 |
| 2018/0086451 A1* | 3/2018 | Vaughn | B64C 39/024 |
| 2018/0095469 A1* | 4/2018 | Leurent | G05D 1/0094 |
| 2018/0196422 A1* | 7/2018 | Chow | G06Q 10/0834 |
| 2019/0002104 A1* | 1/2019 | Kageyama | B64C 13/20 |

FOREIGN PATENT DOCUMENTS

| | | |
|---|---|---|
| KR | 10-2016-0104892 A | 9/2016 |
| KR | 10-2016-0118036 A | 10/2016 |

* cited by examiner

[FIG. 1]
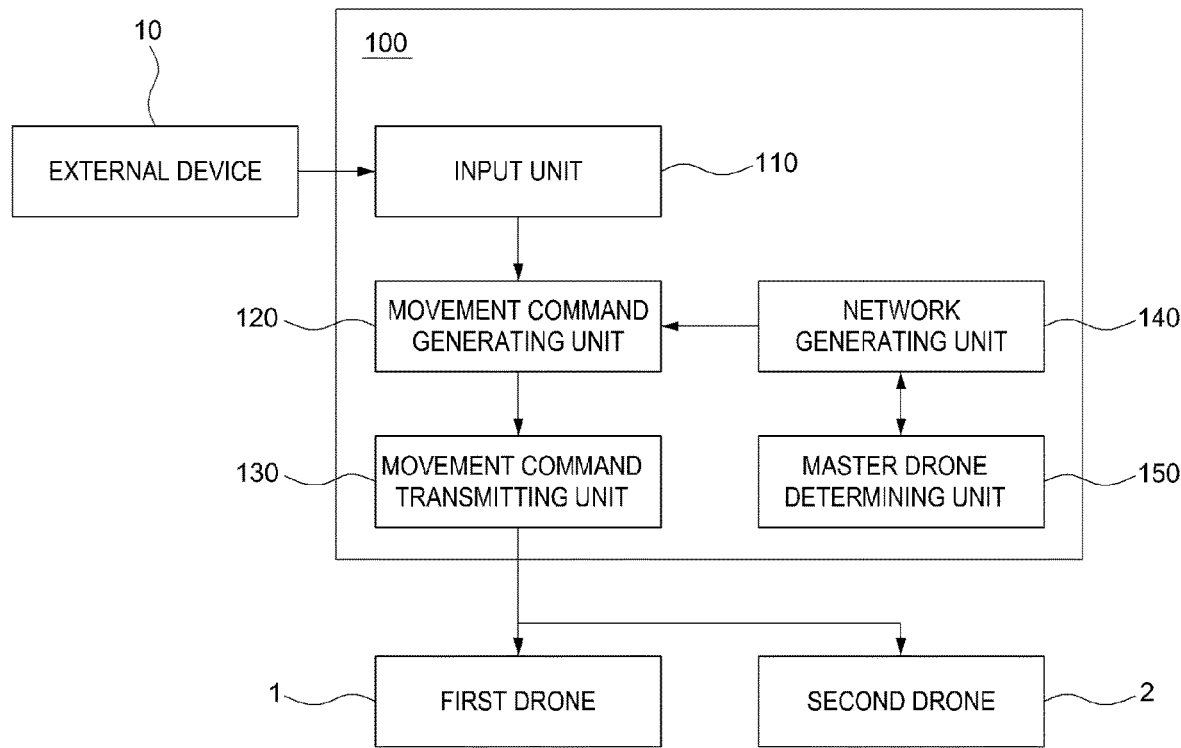
[FIG. 2]
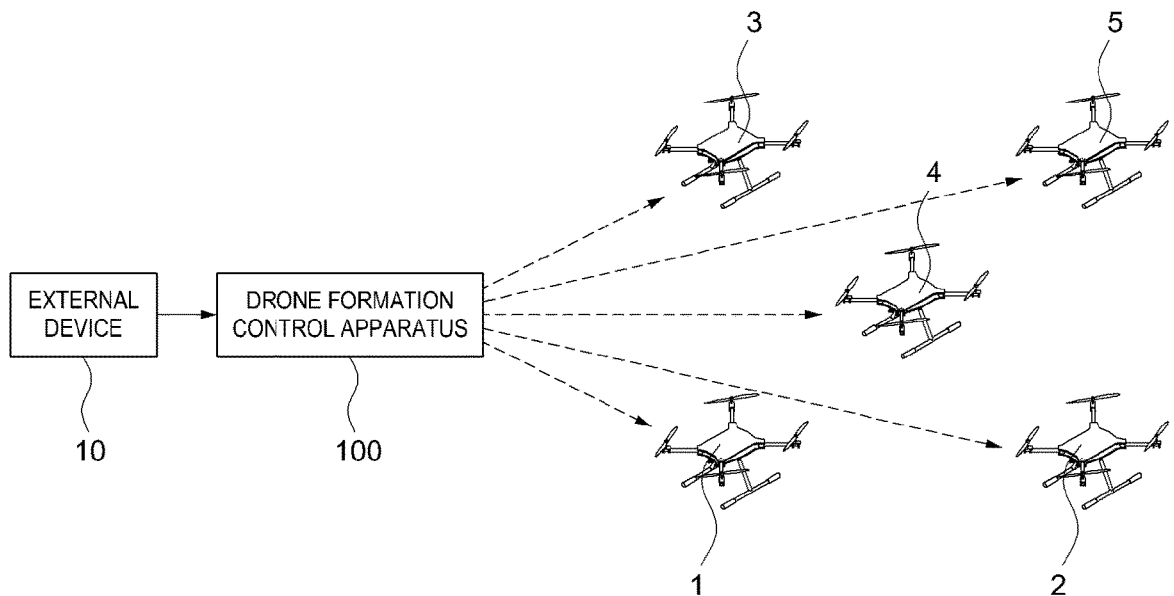

[FIG. 3]
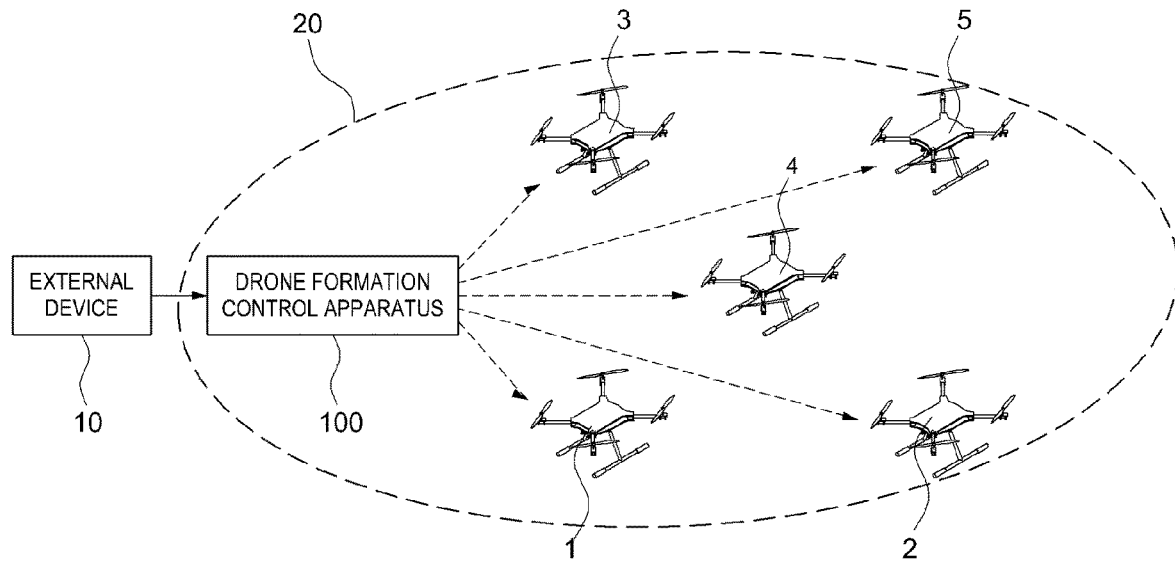
[FIG. 4]
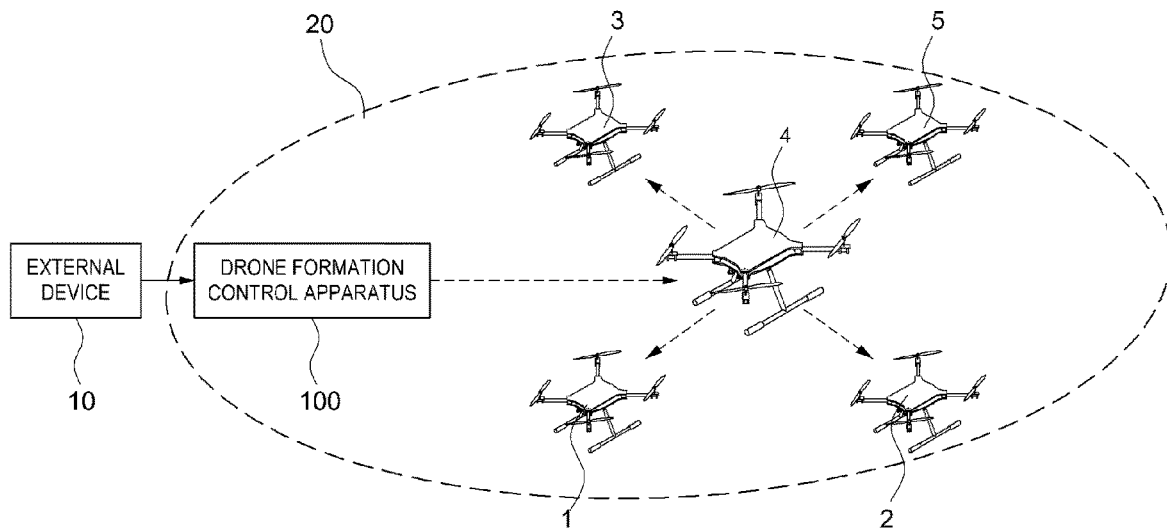

[FIG. 5]
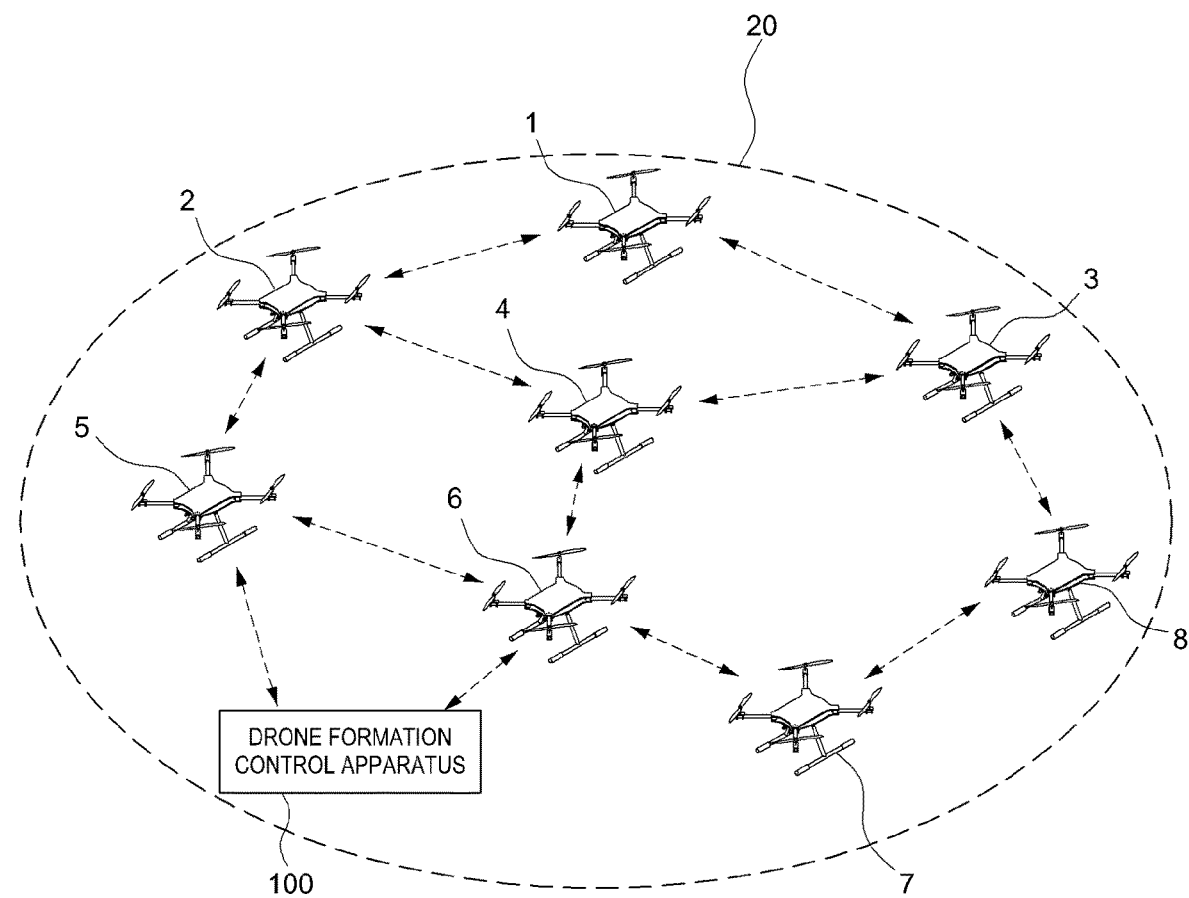

[FIG. 6]
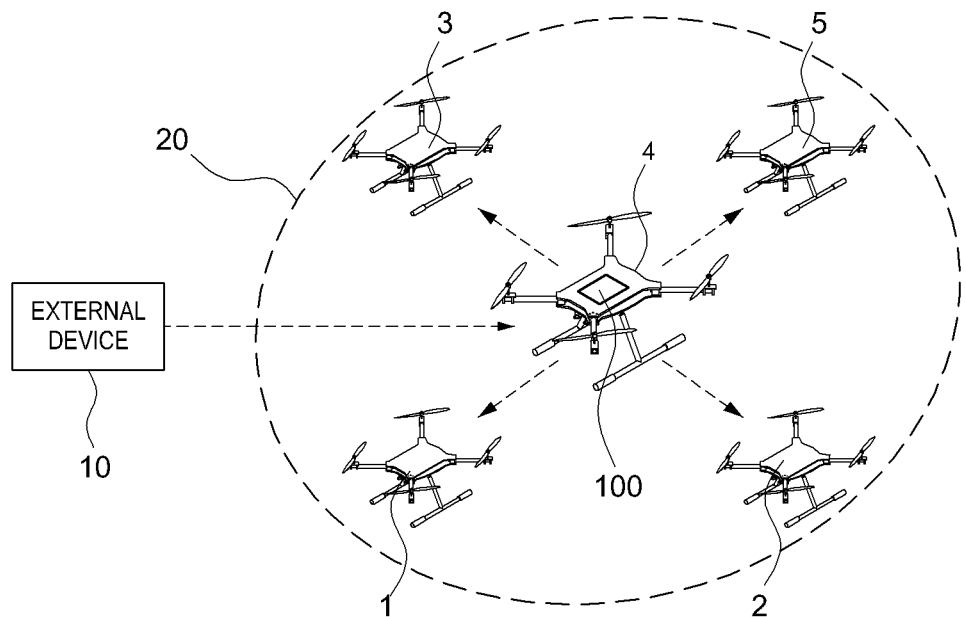
[FIG. 7]
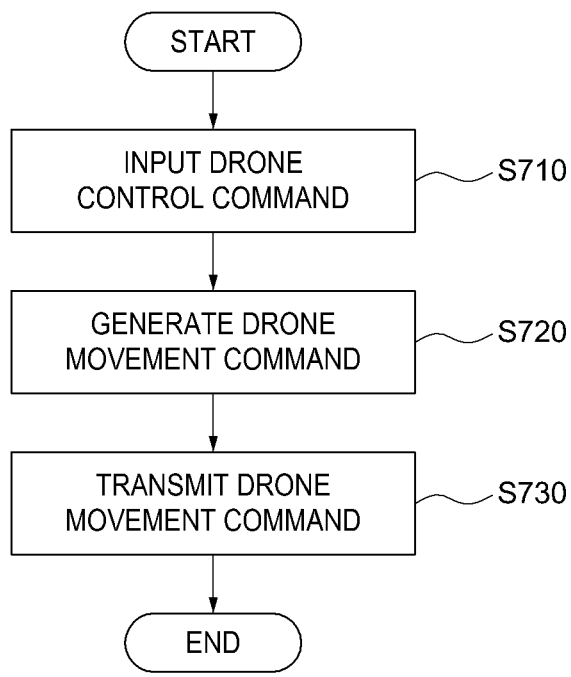

APPARATUS AND METHOD FOR CONTROLLING DRONE FORMATION

CROSS-REFERENCE TO RELATED APPLICATIONS

This application claims the priority of Korean Patent Application No. 10-2017-0079105 filed on Jun. 22, 2017, in the Korean Intellectual Property Office, the disclosure of which is incorporated herein by reference.

BACKGROUND

Field

The present disclosure relates to a drone formation control device for controlling a plurality of drones together included in a drone formation and a method thereof.

Description of the Related Art

A drone means an unmanned aerial vehicle which is controlled by a radio wave. The drone is originally created for military purposes. However, as a production cost of various components of the drone has been lowered, in recent years, a field of application has been widening in various fields such as broadcast image capturing, hobby goods for a kidult industry, and delivery of goods.

As an operating method of the drone, instead of relying on autonomous flight, a pilot directly controls the drone. As a result, in order to operate a drone formation including a plurality of drones, a plurality of pilots is necessary.

For example, in various situations such as a case when a plurality of drones fly in a performance utilizing a plurality of drones or a case when a plurality of drones is utilized to deliver goods, in order to control the plurality of drones, a plurality of pilots who controls each of the plurality of drones is necessary.

As a result, in order to control the drone formation including a plurality of drones, a plurality of pilots needs to be trained and the plurality of pilots needs to cooperate to control the drones. Therefore, training costs and personnel expenses of the pilots are excessively inferred.

However, with regard to this, there has been no attempt to cause a single or small number of pilots to control the plurality of drones at the same time.

SUMMARY

An object of the present disclosure is to receive a drone control command which is a command for controlling a plurality of drones included in a drone formation all together, generate a drone movement command which is a command for moving the plurality of drones to a specific destination based on the drone control command, and transmit a drone movement command to at least one drone among the plurality of drones to simultaneously control the plurality of drones.

Technical problems of the present disclosure are not limited to the above-mentioned technical problems, and other technical problems, which are not mentioned above, can be clearly understood by those skilled in the art from the following descriptions.

According to an aspect of the present disclosure, there is provided a drone formation control apparatus for controlling a plurality of drones included in a drone formation.

The drone formation control apparatus includes an input unit which receives a drone control command which is a command for controlling the plurality of drones together; a movement command generating unit which generates a drone movement command which is a command for moving the plurality of drones to a specific destination, based on the drone control command; and a movement command transmitting unit which transmits the drone movement command to at least one drone of the plurality of drones.

For example, the input unit may receive the drone control command from an external RC controller and the movement command transmitting unit may relay the drone control command to each of the plurality of drones.

For example, the drone formation control apparatus may further include a network generating unit which generates a drone control network which includes the plurality of drones and controls the plurality of drones.

For example, the movement command generating unit may generate the drone movement command further based on a current coordinate of each of the plurality of drones received through the drone control network and the movement command transmitting unit may transmit the drone movement command to each of the plurality of drones.

For example, the drone formation control apparatus may further include a master drone determining unit which determines at least one drone among the plurality of drones included in the drone control network as a mater drone, based on a predetermined criteria.

For example, the movement command generating unit may generate the drone movement command further based on a current coordinate of each of the plurality of drones received through the drone control network, the movement command transmitting unit may transmit the drone movement command to the master drone, and the master drone may transmit the drone movement command to each of the remaining drones excluding the master drone among the plurality of drones included in the drone control network.

According to an exemplary embodiment, the master drone determining unit may determine at least one drone of a drone having a broadest communication range among the plurality of drones, a drone having a longest remaining flight time among the plurality of drones, a drone which may be capable of using the most communication resources among the plurality of drones, and a drone which is the closest to a center of the drone formation among the plurality of drones as the master drone.

According to an exemplary embodiment, the drone movement command may include an individual destination coordinate which is a coordinate of each of the plurality of drones corresponding to the specific destination and the individual destination coordinates may be calculated based on a current representative coordinate ($x_{center}^{init}$, $y_{center}^{init}$, $z_{center}^{init}$) of the drone formation determined according to the predetermined criteria, an x-axis variation $x^{diff}$ of the representative coordinate of the drone formation to move to the specific destination, a y-axis variation $y^{diff}$ of the representative coordinate of the drone formation to move to the specific destination, a z-axis variation $z^{diff}$ of the representative coordinate of the drone formation to move to the specific destination, a rotational amount $\theta^{diff}$ of the drone formation to move to the specific destination, and a current relative coordinate ($x_i^{rel}$, $y_i^{rel}$, $z_i^{rel}$) of each of the plurality of drones with respect to the current representative coordinate of the drone formation.

For example, the drone movement command may include an individual destination coordinate which is a coordinate of each of the plurality of drones corresponding to the specific destination and the individual destination coordinate may be calculated based on the following Equation 7.

$$x_i^{dest} = x_{center}^{init} + x^{diff} + (x_i^{rel} \cdot \cos(\theta^{diff}) + y_i^{rel} \cdot \sin(\theta^{diff}))$$

$$y_i^{dest} = y_{center}^{init} + y^{diff} + (x_i^{rel} \cdot \sin(\theta^{diff}) + y_i^{rel} \cdot \cos(\theta^{diff}))$$

$$z_i^{dest} = z_{center}^{init} + z^{diff} + z_i^{rel} \quad \text{[Equation 7]}$$

In this case, $(x_i^{dest}, y_i^{dest}, z_i^{dest})$ is the individual destination coordinate of an i-th drone included in the drone formation and $(x_{center}^{init}, y_{center}^{init}, z_{center}^{init})$ is a current representative coordinate of the drone formation determined according to a predetermined criteria, $x^{diff}$ is an x-axis variation of the representative coordinate of the drone formation to move to the specific destination, $y^{diff}$ is a y-axis variation of the representative coordinate of the drone formation to move to the specific destination, $z^{diff}$ is a z-axis variation of the representative coordinate of the drone formation to move to the specific destination, $\theta^{diff}$ is a rotational amount of the drone formation to move to the specific destination, and $(x_i^{rel}, y_i^{rel}, z_i^{rel})$ means a current relative coordinate of the i-th drone with respect to the current representative coordinate of the drone formation.

According to an exemplary embodiment, the drone formation control apparatus may be mounted in the master drone.

According to another aspect of the present disclosure, there is provided a drone formation control method for controlling a drone formation by utilizing a drone formation control apparatus which controls a plurality of drones included in a drone formation.

For example, the drone formation control method includes receiving a drone control command which is a command for controlling the plurality of drones together, by an input unit, generating a drone movement command which is a command for moving the plurality of drones to a specific destination, based on the drone control command, by a movement command generating unit, and transmitting the drone movement command to at least one drone of the plurality of drones, by a movement command transmitting unit.

For example, the drone formation control method may further include generating a drone control network which includes the plurality of drones and controls the plurality of drones, by a network generating unit.

For example, the drone formation control method may further include determining at least one drone among the plurality of drones included in the drone control network as a mater drone, based on a predetermined criteria, by a master drone determining unit.

According to an exemplary embodiment of the present disclosure, a drone control command which is a command for controlling a plurality of drones included in a drone formation together is input, a drone movement command which is a command for moving the plurality of drones to a specific destination is generated based on the drone control command, and the drone movement command is transmitted to at least one drone among the plurality of drones to simultaneously control the plurality of drones, so that a plurality of drones may be effectively controlled by a smaller number of pilots than the number of the plurality of drones.

BRIEF DESCRIPTION OF THE DRAWINGS

The above and other aspects, features and other advantages of the present disclosure will be more clearly understood from the following detailed description taken in conjunction with the accompanying drawing.

FIG. 1 is a block diagram for explaining a drone formation control apparatus.

FIG. 2 is a view for explaining a first example in which a drone formation control apparatus controls a plurality of drones.

FIG. 3 is a view for explaining a second example in which a drone formation control apparatus controls a plurality of drones.

FIG. 4 is a view for explaining a third example in which a drone formation control apparatus controls a plurality of drones.

FIG. 5 is a view for explaining a drone control network generated by a drone formation control apparatus and a master drone determining method.

FIG. 6 is a view for explaining a fourth example in which a drone formation control apparatus is directly mounted in a master drone to control a plurality of drones.

FIG. 7 is a flowchart for explaining a drone formation control method.

DETAILED DESCRIPTION

Hereinafter, the most preferred exemplary embodiments of the present invention will be described in detail with reference to the accompanying drawings so that those skilled in the art may easily carry out the technical spirit of the present invention. In the figures, even though the parts are illustrated in different drawings, it should be understood that like reference numbers refer to the same or equivalent parts of the present invention throughout the several figures of the drawing. In addition, in the description of the present disclosure, the detailed descriptions of publicly known related constitutions or functions thereof may be omitted if they make the gist of the present disclosure unclear.

Hereinafter, a drone formation control apparatus and a method according to an exemplary embodiment of the present disclosure will be described in detail with reference to the accompanying drawings.

First, a drone formation control apparatus 100 according to an exemplary embodiment of the present disclosure will be described with reference to FIG. 1.

FIG. 1 is a block diagram for explaining a drone formation control apparatus.

As illustrated in FIG. 1, a drone formation control apparatus includes an input unit 110, a movement command generating unit 120, and a movement command transmitting unit 130.

In some scenarios, the drone formation control apparatus 100 may further include at least one of a network generating unit 140 and a master drone determining unit 150, but the present disclosure is not limited thereto.

For example, the drone formation control apparatus 100 may refer to a drone formation control apparatus 100 which controls a plurality of drones 1 and 2 included in a drone formation.

In this case, for the convenience of description, in FIG. 1, it is illustrated that the drone formation includes a total of two drones of a first drone 1 and a second drone 2. However, in the drone formation control apparatus 100, the drone formation is not limited to include two drones.

In some scenarios, the plurality of drones 1 and 2 performs a flying function and a network configuring function and the plurality of drones may include a fight module and a network module to perform the above-mentioned functions.

For example, the flight module figures out posture and position information of the plurality of drones 1 and 2 and controls the posture and the position based thereon. In order to control the posture and the position, the flight module adjusts a propulsive force. For example, when each of the plurality of drones 1 and 2 is a multicopter, the flight module may adjust a rotation speed of a motor and propeller mounted therein.

For example, the network module may build a drone control network with nearby drones and the drone formation control apparatus 100 to ensure connectivity of nodes (drones and a drone control module) belonging to the drone control network and configure an environment where the nodes transmit and receive data.

In addition, each of the plurality of drones 1 and 2 may further mount various functions mounted in various unmanned aerial vehicles known in the related art and each of the plurality of drones 1 and 2 of the present disclosure is not limited to a specific type of drone.

The input unit 110 receives a drone control command which is a command for controlling the plurality of drones 1 and 2 together.

For example, the input unit 110 may receive the above-mentioned drone control command from a separate external device 10 which is manipulated by a pilot to control the plurality of drones 1 and 2, but the present disclosure is not limited thereto.

For example, the external device 10 may refer to various command input devices of the related art which are utilized to control a single drone, such as an RC controller, a keyboard, a wired/wireless joy pad, and a mouse.

For example, the external device 10 may refer to various external computing units including a notebook, a computer, a smart phone, a tablet, and a PDA. In this case, the input unit 110 may refer to a communication module which performs various short distance wireless communication such as WiFi, Bluetooth, or Zigbee or various long distance wireless communication such as a CDMA, 3G, or LTE communication, with the above-described external computing unit.

For example, the input unit 110 may refer to a connection terminal which is directly connected to the above-described external computing unit through a cable to perform wired communication.

In other words, the input unit 110 may refer to means which receives a drone control command from various external devices 10 which are manipulated by a pilot who controls a drone formation.

In this case, the drone control command may include various information including information on a flying direction of the plurality of drones 1 and 2 and information on a rotational amount of the plurality of drones 1 and 2. The information is input from various command input devices including an RC controller, a keyboard, a wired/wireless joy pad, and a mouse.

For example, when the command input device is a joy pad, if the joy pad is manipulated to the left, the drone control command means a command that moves the plurality of drones 1 and 2 to the left. More detailed description of the drone control command may be the same as the various methods for controlling the single drone in the related art so that detailed description will be omitted.

For example, the drone control command may refer to a coordinate value corresponding to a specific destination to move the plurality of drones to a specific destination, but the present disclosure is not limited thereto. The coordinate value is input from various external computing units including a notebook, a computer, a smart phone, a tablet, and a PDA.

The movement command generating unit 120 generates a drone movement command which is a command for moving the plurality of drones 1 and 2 to a specific destination based on the drone control command.

The drone movement command may be generated to correspond to the above-described drone control command. The drone movement command may be an RC signal to be transmitted to each of the plurality of drones 1 and 2, but the present disclosure is not limited thereto.

For more understanding of the present disclosure, a relationship between the drone control command input to the input unit 110 and the drone movement command generated by the movement command generating unit 120 will be described using a general drone of the related art in which a single drone is controlled using an RC controller as an example. However, the present disclosure is provided to control the plurality of drones 1 and 2 included in the drone formation together, so that the present disclosure is not limited to examples which will be described below.

For example, the pilot inputs a drone control command through various buttons of the RC controller to control the single drone of the related art. In this case, the RC controller converts the drone control command input by the drone pilot into a signal which will be processed by the single drone to transmit the converted signal to the single drone as an RC signal.

In this case, the RC signal which is converted to be processed by the single drone may correspond to the drone movement command of the present disclosure, but the present disclosure is not limited thereto.

In other words, the drone movement command generated by the movement command generating unit 120 may refer to an RC signal which is processed such that the drone control command collected from the external device 10 is understandable by the plurality of drones 1 and 2, but the present disclosure is not limited thereto.

The movement command generating unit 120 may perform the same information processing as the single drone control method known in the related art to generate the drone movement command based on the drone control command, but the present disclosure is not limited thereto.

The movement command transmitting unit 130 transmits the drone movement command to at least one drone of the plurality of drones 1 and 2.

For example, the movement command transmitting unit 130 may directly transmit the above-described drone movement command to each of the plurality of drones 1 and 2.

The movement command transmitting unit 130 may transmit the above-described drone movement command to a master drone selected from the plurality of drones 1 and 2.

The network generating unit 140 and the master drone determining unit 150 of the drone formation control apparatus will be described below with reference to FIGS. 3 and 4 and a redundant description will be omitted.

Now, a first example in which a drone formation control apparatus 100 controls a plurality of drones will be described with reference to FIG. 2.

FIG. 2 is a view for explaining a first example in which a drone formation control apparatus controls a plurality of drones.

In the first example, a drone formation control apparatus 100 may transmit a drone movement command to each of a plurality of drones 1 to 5 included in a drone formation.

More specifically, the input unit 110 receives a drone control command from an external RC controller and the movement command transmitting unit 130 may relay the drone control command to each of the drones 1 to 5.

For example, in the first example, the drone formation control apparatus 100 may directly relay the drone control command received from the external RC controller to each of the plurality of drones 1 to 5.

As a result, the drone movement command for controlling the single drone in the related art is directly transmitted to each of the plurality of drones 1 to 5 so that each of the plurality of drones 1 to 5 moves to the same distance and rotates by the same angle.

For example, in the first example, the movement command generating unit 120 scales the drone control command received from the external RC controller by a predetermined amount and adds a predetermined offset value to generate a drone movement command. In this case, the movement command transmitting unit 130 may transmit the drone movement command generated by the drone command generating unit 120 to each of the plurality of drones 1 to 5, but the present disclosure is not limited thereto.

For example, the drone movement command generated in the first example may be generated based on the following Equation 1, but the present disclosure is not limited thereto.

$$\text{send}(ch_{num}) = \alpha \times \text{recv}(ch_{num}) + \beta \qquad \text{[Equation 1]}$$

In this case, $\text{send}(ch_{num})$ is a drone movement command transmitted through a specific channel $ch_{num}$ and $\text{recv}(ch_{num})$ is a drone control command received through the specific channel $ch_{num}$, $\alpha$ is a predetermined scaling value, and $\beta$ is a predetermined offset value.

For example, according to the first example, a drone control network between the plurality of drones 1 to 5 and the drone formation control apparatus 100 may not be generated. The plurality of drones 1, 2, 3, 4, and 5 may perform the same movement and the same rotation based on the drone control command relayed by the drone formation control apparatus 100.

As illustrated in FIG. 1, the drone formation control apparatus 100 may further include a network generating unit 140.

The network generating unit 140 includes a plurality of drones 1 and 2 and generates a drone control network which is a network for controlling the plurality of drones 1 and 2.

In this case, the drone control network may refer to a network including the drone formation control apparatus 100 and the plurality of drones 1 and 2. The drone formation control apparatus 100 and the plurality of drones 1 and 2 may transmit and receive data through the drone control network.

Now, a drone control network generated by the network generating unit 140 will be described with reference to FIG. 5.

FIG. 5 is a view for explaining a drone control network generated by a drone formation control apparatus and a master drone determining method.

As illustrated in FIG. 5, the drone control network 20 generated by the network generating unit 140 may include a drone formation control apparatus 100 and a plurality of drones 1 to 8.

In this case, the drone formation control apparatus 100 and the plurality of drones 1 to 8 may transmit and receive data therebetween through the drone control network 20.

In this case, the network generating unit 140 may utilize various short distance wireless communication techniques including WiFi and Bluetooth and various long distance wireless communication techniques including 3G and LTE. In addition, the network generating unit 140 may generate the above-described drone control network 20 by utilizing various wireless communication techniques including UWB or satellite communication. However, a communication method which is utilized by the network generating unit 140 is not limited to a specific communication method.

In order to identify the drone formation control apparatus 100 and the plurality of drones 1 to 8 on the drone control network 20, unique identification numbers may be assigned to the drone formation control apparatus 100 and the plurality of drones 1 to 8.

In this case, the drone formation control apparatus 100 and the plurality of drones 1 to 8 on the drone control network 20 are distinguished and identified by the identification numbers.

In this case, the identification numbers may refer to various identification numbers including a network address such as an IP address and also include identification numbers corresponding to communication packets generated by the drone formation control apparatus 100 and the plurality of drones 1 to 8 on the drone control network 20.

For example, when the IP address is utilized as an identification number, the identification number may be formed of xxx.xxx.xxx.<node ID>, but the present disclosure is not limited thereto.

For example, in order to share information on each of the plurality of drones 1 to 8 through the drone control network 20, a method which flexibly recognizes the plurality of drones 1 to 8 may be necessary.

In this case, the method which flexibly recognizes the plurality of drones 1 to 8 means that a drone which may be newly assigned to the drone control network 20 is recognized or the drone network 20 may normally operate even when a drone which is carrying out an assignment stops operation or information is not sent.

For example, the method that flexibly recognizes the plurality of drones 1 to 8 included in the drone control network 20 may be necessary for various situations such as a situation where a plurality of drones is lost or disconnected due to environmental influence or errors while carrying out the assignment, a situation where a drone needs to be newly included according to an assignment during the assignment, or a situation where the drone needs to be replaced during the assignment. Specific description of the method which flexibly recognizes the drones is the same as those described in the related art and thus is omitted.

For example, in order to control the plurality of drones 1 to 8 included in the drone control network 20, the drone formation control apparatus 100 may receive and utilize information of the plurality of drones 1 to 8.

In this case, information received from the plurality of drones 1 to 8 by the drone formation control apparatus 100 may include at least one of a network address of each of the plurality of drones 1 to 8 and an identification number of each of the plurality of drones 1 to 8, but the present disclosure is not limited thereto.

A second example in which the drone formation control apparatus 100 controls the plurality of drones 1 to 5 through a drone control network 20 will be described with reference to FIG. 3.

FIG. 3 is a view for explaining a second example in which a drone formation control apparatus controls a plurality of drones.

In the second example in which the drone formation control apparatus 100 controls a plurality of drones, a drone control network 20 is generated. Therefore, the drone formation control apparatus 100 may receive a current coordinate of each of the plurality of drones 1 to 5 and generate a movement command therethrough.

In the second example, the movement command generating unit 120 generates a drone movement command further based on the current coordinate of each of the plurality of drones 1 to 5 received through the drone control network 20. The movement command transmitting unit 130 may transmit the drone movement command to each of the plurality of drones 1 to 5.

In this case, the drone control command and the drone movement command generated based on the current coordinate of each of the plurality of drones 1 to 5 will be described below and a redundant description will be omitted.

As illustrated in FIG. 1, the drone formation control apparatus 100 may further include a master drone determining unit 150.

The master drone determining unit 150 determines at least one drone among the plurality of drones 1 to 5 included in the drone control network 20 based on a predetermined condition, as a master drone.

Now, a method for determining a master drone among the plurality of drones 1 to 5 included in the drone control network 20 by the master drone determining unit 150 will be described with reference to FIG. 5.

For example, the master drone determining unit 150 may determine at least one drone among a drone having a broadest communication range among the plurality of drones 1 to 8, a drone having a longest remaining flight time among the plurality of drones 1 to 8, a drone which may be capable of using the most communication resources among the plurality of drones 1 to 8, and a drone which is the closest to a center of the drone formation among the plurality of drones 1 to 8, as a master drone.

For example, the master drone determining unit 150 may determine at least one drone of a drone which has the largest number of drones connected thereto through a communication among the plurality of drones 1 to 8 and a drone having the smallest number of hops to a drone which is the farthest drone in the drone formation, among the plurality of drones 1 to 8, as a master drone.

For example, the master drone determining unit 150 may determine a drone arbitrary selected among the plurality of drones 1 to 8 as a master drone.

For example, the drone having the broadest communication range among the plurality of drones 1 to 8 may be determined based on individual communication specifications of the plurality of drones 1 to 8.

For example, the drone having the longest remaining flight time among the plurality of drones 1 to 8 may refer to a drone having the most remaining battery amount among the plurality of drones 1 to 8.

For example, the drone which is capable of using the most communication resources among the plurality of drones 1 to 8 may be determined based on individual communication specifications of the plurality of drones 1 to 8 and the number of currently available communication channels.

For example, the drone which is the closest to the center of the drone formation among the plurality of drones 1 to 8 may be determined according to a geographical location in the drone formation. For example, a fourth drone 4 illustrated in FIG. 5 is a drone which is the closest to the center of the formation among the plurality of drones 1 to 8 so that the fourth drone 4 may be determined as a master drone.

For example, as the drone which has the largest number of drones connected thereto through a communication among the plurality of drones 1 to 8, a drone having the most neighboring drones may be determined. For example, a second drone 2, a third drone 3, a fourth drone 4, and a sixth drone 6 illustrated in FIG. 5 have three neighboring drones which are the most neighboring drones, at least one of the second drone 2, the third drone 3, the fourth drone 4, and the sixth drone 6 may be determined as a master drone.

For example, a drone having the smallest number of hops to the farthest drone in the drone formation, among the plurality of drones 1 to 8 may refer to the fourth drone 4 in FIG. 5.

For example, the fourth drone 4 may communicate with the second drone 2, the third drone 3, and the sixth drone 6 by a single hop and communicate with the first drone 1, the fifth drone 5, the seventh drone 7, and the eight drone 8 by two hops. As a result, the fourth drone 4 may be determined as a master drone.

For example, the master drone determining unit 150 may determine the master drone by a combination of two or more of the plurality of criteria described above, but the present disclosure is not limited thereto.

Now, a third example in which the drone formation control apparatus 100 controls the plurality of drones 1 to 5 through the drone control network 20 and the master drone 4 will be described with reference to FIG. 4.

FIG. 4 is a view for explaining a third example in which a drone formation control apparatus controls a plurality of drones.

In the third example in which the drone formation control apparatus 100 controls a plurality of drones, the drone control network 20 is generated and the master drone 4 is determined. Therefore, the drone formation control apparatus 100 may receive a current coordinate of each of the plurality of drones 1 to 5, generate a drone movement command therethrough and transmit the generated drone movement command to the master drone 4.

In the third example, the movement command generating unit 120 generates a drone movement command further based on the current coordinate of each of the plurality of drones 1 to 5 received through the drone control network 20. The movement command transmitting unit 130 may transmit the drone movement command to the master drone 4. The master drone 4 may transmit the drone movement command to each of the plurality of drones 1, 2, 3, and 5 excluding the master drone among the plurality of drones 1 to 5 included in the drone control network 20.

In this case, the master drone 4 may transmit the above-described drone movement command to the remaining drones 1, 2, 3, and 5 using a single hop or multi-hop method, but the present disclosure is not limited thereto.

In this case, the drone control command and the drone movement command generated based on the current coordinate of each of the plurality of drones 1 to 5 will be described below and a redundant description will be omitted.

Now, in the second example and the third example in which the drone formation control apparatus 100 controls the plurality of drones 1 to 5, a specific method of generating a drone movement command based on a drone control command and a current coordinate of each of the plurality of drones 1 to 5 will be described.

In this case, the drone control command may include movement amount information for every coordinate axis of a drone formation including the plurality of drones 1 to 5 and rotational amount information of the drone formation.

In this case, the generated drone movement command may include an individual destination coordinate of each of the plurality of drones 1 to 5 included in the drone formation.

Hereinafter, a method of generating a drone movement command by the movement command generating unit 120 will be described.

First, the movement command generating unit 120 determines a current representative coordinate ($x_{center}^{init}$, $y_{center}^{init}$, $z_{center}^{init}$) of the drone formation.

In this case, the representative coordinate of the drone formation may refer to one coordinate representing the drone formation including the plurality of drones 1 to 5.

For example, the movement command generating unit 120 may determine a current individual coordinate of a specific drone which is arbitrarily selected among the current individual coordinates of the plurality of drones 1 to 5 included in the drone formation as a current representative coordinate of the drone formation, which will be represented by the following Equation 2.

$$x_{center}^{init} = x_{selected\ drone}^{init}$$

$$y_{center}^{init} = y_{selected\ drone}^{init}$$

$$z_{center}^{init} = z_{selected\ drone}^{init} \quad \text{[Equation 2]}$$

In this case, ($x_{center}^{init}$, $y_{center}^{init}$, $z_{center}^{init}$) means a current representative coordinate of the drone formation and ($x_{selected\ drone}^{init}$, $y_{selected\ drone}^{init}$, $z_{selected\ drone}^{init}$) means a current individual coordinate of a specific drone arbitrary selected from the plurality of drones 1 to 5 included in the drone formation.

In another example, the movement command generating unit 120 may determine an arbitrarily set coordinate (a, b, c) as a current representative coordinate, which may be represented by the following Equation 3.

$$x_{center}^{init} = a$$

$$y_{center}^{init} = b$$

$$z_{center}^{init} = c \quad \text{[Equation 3]}$$

In this case, ($x_{center}^{init}$, $y_{center}^{init}$, $z_{center}^{init}$) means the current representative coordinate of the drone formation and (a, b, c) means an arbitrarily set coordinate.

In another example, the movement command generating unit 120 may determine an average of current individual coordinates of the plurality of drones 1 to 5 included in the drone formation as a current representative coordinate of the drone formation, which will be represented by the following Equation 4.

$$x_{center}^{init} = \frac{\sum_{i=1}^{N} x_i^{init}}{N}$$

$$y_{center}^{init} = \frac{\sum_{i=1}^{N} y_i^{init}}{N}$$

$$z_{center}^{init} = \frac{\sum_{i=1}^{N} z_i^{init}}{N} \quad \text{[Equation 4]}$$

In this case, ($x_{center}^{init}$, $y_{center}^{init}$, $z_{center}^{init}$) means a current representative coordinate of the drone formation, N means the number of the plurality of drones 1 to 5 included in the drone formation, and ($x_i^{init}$, $y_i^{init}$, $z_i^{init}$) means a current individual coordinate of an i-th drone of the plurality of drones 1 to 5 included in the drone formation.

For example, when the current representative coordinate of the drone formation is calculated, the movement command generating unit 120 may not calculate a Z axis coordinate, but the present disclosure is not limited thereto.

Thereafter, the movement command generating unit 120 may calculate a current relative coordinate ($x_i^{rel}$, $y_i^{rel}$, $z_i^{rel}$) of each of the plurality of drones based on the current representative coordinate ($x_{center}^{init}$, $y_{center}^{init}$, $z_{center}^{init}$) of the drone formation, which may be represented by the following Equation 5.

$$x_i^{rel} = x_i^{rel} - x_{center}^{init}$$

$$y_i^{rel} = y_i^{rel} - y_{center}^{init}$$

$$z_i^{rel} = z_i^{rel} - z_{center}^{init} \quad \text{[Equation 5]}$$

In this case, ($x_{center}^{init}$, $y_{center}^{init}$, $z_{center}^{init}$) means the current representative coordinate of the drone formation, ($x_i^{init}$, $y_i^{init}$, $z_i^{init}$) means a current individual coordinate of the i-th drone among the plurality of drones 1 to 5 included in the drone formation, and ($x_i^{rel}$, $y_i^{rel}$, $z_i^{rel}$) means the current relative coordinate ($x_i^{rel}$, $y_i^{rel}$, $z_i^{rel}$) of the i-th drone with respect to the current representative coordinate ($x_{center}^{init}$, $y_{center}^{init}$, $z_{center}^{init}$) of the drone formation.

By doing this, the current individual coordinate of each of the plurality of drones 1 to 5 included in the drone formation may be represented as a relative coordinate with respect to the current representative coordinate of the drone formation.

In the meantime, when the current representative coordinate of the drone formation is calculated, if the movement command generating unit 120 does not calculate the Z axis coordinate, a Z axis value of the current relative coordinate of each of the plurality of drones 1 to 5 included in the drone formation may be set as 0.

Thereafter, the movement command generating unit 120 may determine an x-axis variation $x^{diff}$, a y-axis variation $y^{diff}$, a z-axis variation $z^{diff}$ of the representative coordinate of the drone formation and a rotational amount $\theta^{diff}$ of the drone formation to move the drone formation to a specific destination based on the drone control command received by the input unit 110.

For example, it is assumed that when the current representative coordinate of the drone formation is (1, 2, 3), the plurality of drones 1 to 5 included in the drone formation is directed to the north, a coordinate representing the specific destination is (5, 4, 7), a drone control command which directs the plurality of drones to the east in the specific destination is input.

In this case, the movement command generating unit 120 may determine that the x-axis variation $x^{diff}$ of the representative coordinate of the drone formation is +4, the y-axis variations $y^{diff}$ of the representative coordinate of the drone formation is +2, the z-axis variation $z^{diff}$ of the representative coordinate of the drone formation is +4, and the rotational amount $\theta^{diff}$ of the drone formation is 90 degrees in a clockwise direction.

In this case, an example in which the movement command generating unit 120 determines an x-axis variation $x^{diff}$, a y-axis variation $y^{diff}$, a z-axis variation $z^{diff}$ of the representative coordinate of the drone formation and a rotational amount $\theta^{diff}$ of the drone formation to move the drone formation to a specific destination based on the drone control command received by the input unit 110 is represented by the following Equation 6. However, the present disclosure is not limited thereto.

$$x^{diff} = x^{diff}(t-1) + RC(ch_x)$$

$$y^{diff} = y^{diff}(t-1) + RC(ch_y)$$

$$z^{diff} = z^{diff}(t-1) + RC(ch_z)$$

$$\theta^{diff} = \theta^{diff}(t-1) + RC(ch_\theta) \qquad \text{[Equation 6]}$$

In this case, $x^{diff}$ means an x-axis variation of the representative coordinate of the drone formation, $y^{diff}$ means a y-axis variation of the representative coordinate of the drone formation, $z^{diff}$ means a z-axis variation of the representative coordinate of the drone formation, and $\theta^{diff}$ means a rotational amount of the representative coordinate of the drone formation.

In the meantime, $x^{diff}(t-1)$ means the x-axis variation of the representative coordinate of the drone formation determined at a previous time and $RC(ch_x)$ means an x-axis variation of the representative coordinate of the drone formation included in the drone control command which is received at the present time. $ch_x$ means a channel utilized to receive the x-axis variation of the representative coordinate of the drone formation and RC( ) means a function of calculating the variation or the rotational amount of the representative coordinate of the drone formation based on the drone control command.)

Similarly, $y^{diff}(t-1)$ means the y-axis variation of the representative coordinate of the drone formation determined at a previous time and $RC(ch_y)$ means a y-axis variation of the representative coordinate of the drone formation included in the drone control command which is received at the present time. $ch_y$ means a channel utilized to receive the y-axis variation of the representative coordinate of the drone formation and RC( ) means a function of calculating the variation or the rotational amount of the representative coordinate of the drone formation based on the drone control command.

Further, $z^{diff}(t-1)$ means the z-axis variation of the representative coordinate of the drone formation determined at a previous time and $RC(ch_z)$ means a z-axis variation of the representative coordinate of the drone formation included in the drone control command which is received at the present time. $ch_z$ means a channel utilized to receive the z-axis variation of the representative coordinate of the drone formation and RC( ) means a function of calculating the variation or the rotational amount of the representative coordinate of the drone formation based on the drone control command.

Moreover, $\theta^{diff}(t-1)$ means the rotational amount of the drone formation determined at a previous time and $RC(ch_\theta)$ means a rotational amount of the drone formation included in the drone control command which is received at the present time. $ch_\theta$ means a channel utilized to receive the rotational amount of the drone formation and RC( ) means a function of calculating the variation or the rotational amount of the representative coordinate of the drone formation based on the drone control command.

In other words, in the above-described Equation 6, the x-axis variation $x^{diff}$, the y-axis variation $y^{diff}$, and the z-axis variation $z^{diff}$ of the representative coordinate of the drone formation may mean the variations of a coordinate to which the drone formation needs to move to arrive at the specific destination from an initial location of the representative coordinate of the drone formation. Further, the rotational amount $\theta^{diff}$ of the drone formation means how much the drone formation needs to rotate to arrive at a specific destination from the initial direction of the drone formation.

According to the example, the x-axis variation $x^{diff}$ of the representative coordinate of the drone formation, the y-axis variation $y^{diff}$ of the representative coordinate of the drone formation, and the z-axis variation $z^{diff}$ of the representative coordinate of the drone formation, and the rotational amount $\theta^{diff}$ of the drone formation may use the same method as the method for generating a movement command transmitted to the single drone from the RC controller for controlling the single drone of the related art. The detailed description thereof will be omitted.

Thereafter, the movement command generating unit 120 may generate a drone movement command including individual destination coordinates which are individual coordinates of the plurality of drones 1 to 5 corresponding to the specific destination.

In this case, the individual destination coordinates of the plurality of drones included in the drone movement command may be calculated based on the following Equation 7.

$$x_i^{dest} = x_{center}^{init} + x^{diff} + (x_i^{rel} \cdot \cos(\theta^{diff}) + y_i^{rel} \cdot \sin(\theta^{diff}))$$

$$y_i^{dest} = y_{center}^{init} + y^{diff} + (x_i^{rel} \cdot \sin(\theta^{diff}) + y_i^{rel} \cdot \cos(\theta^{diff}))$$

$$z_i^{dest} = z_{center}^{init} + z^{diff} + z_i^{rel} \qquad \text{[Equation 7]}$$

In this case, $(x_i^{dest}, y_i^{dest}, z_i^{dest})$ is the individual destination coordinate of an i-th drone included in the drone formation and $(x_{center}^{init}, y_{center}^{init}, z_{center}^{init})$ is a current representative coordinate of the drone formation determined according to a predetermined criteria. $x^{diff}$ is an x-axis variation of the representative coordinate of the drone formation to move to the specific destination, $y^{diff}$ is a y-axis variation of the representative coordinate of the drone formation to move to the specific destination, $z^{diff}$ is a z-axis variation of the representative coordinate of the drone formation to move to the specific destination, and $\theta^{diff}$ is a rotational amount of the drone formation to move to the specific destination. Further, $(x_i^{rel}, y_i^{rel}, z_i^{rel})$ means a current relative coordinate of the i-th drone with respect to the current representative coordinate of the drone formation.

In other words, the individual destination coordinates of the plurality of drones included in the drone movement command may be calculated based on the current representative coordinate $(x_{center}^{init}, y_{center}^{init}, z_{center}^{init})$ of the drone formation determined according to the predetermined criteria, the x-axis variation $x^{diff}$ of the representative coordinate of the drone formation to move to the specific destination, the y-axis variation $y^{diff}$ of the representative coordinate of the drone formation to move to the specific destination, the z-axis variation $z^{diff}$ of the representative coordinate of the drone formation to move to the specific destination, the rotational amount $\theta^{diff}$ of the drone formation to move to the specific destination, and the current relative coordinate $(x_i^{rel}, y_i^{rel}, z_i^{rel})$ of each of the plurality of drones with respect to the current representative coordinate of the drone formation.

According to the example, the movement command generating unit 120 may generate an RC signal type drone movement command to transmit the individual destination coordinates of the plurality of drones 1 to 5 as described above to each of the plurality of drones 1 to 5 included in the drone control network 20 and the method thereof is represented by the following Equation 8.

$$\text{send}(ch_x) = \alpha \cdot (x_i^{dest} - x_i) + \beta$$

$$\text{send}(ch_y) = \alpha \cdot (y_i^{dest} - y_i) + \beta$$

$$\text{send}(ch_z) = \alpha \cdot (z_i^{dest} - z_i) + \beta \qquad \text{[Equation 8]}$$

In this case, send($ch_m$) is an RC signal to be transmitted to a specific channel $ch_m$, $\alpha$ and $\beta$ are arbitrary variations used to input an appropriate value to the channel, ($x_i^{dest}$, $y_i^{dest}$, $z_i^{dest}$) is an individual destination coordinate of the i-th drone included in the drone formation, and ($x_i$, $y_i$, $z_i$) is a current individual coordinate of the i-th drone.

In this case, the movement command generating unit 120 may utilize various equations known in the related art in addition to the above-described Equation 8 to generate the RC signal and the present disclosure is not limited to a specific equation to generate the RC signal.

In the meantime, the movement command generating unit 120 may generate the drone movement command based on a previously input flight path (destination information according to a time), but the present disclosure is not limited thereto.

Now, a fourth example in which the drone formation control apparatus 100 is directly mounted in the master drone 4 to control the plurality of drones 1 to 5 will be described with reference to FIG. 6.

In this case, the drone formation control apparatus 100 may be mounted in the master drone 4 and an operation of the drone formation control apparatus 100 of the fourth example is the same as that in the third example, so that a redundant description will be omitted.

For example, the drone formation control apparatus 100 is mounted in each of the plurality of drones 1 to 5 in advance and only the drone formation control apparatus 100 included in the master drone 4 which is determined by the above-described master drone determining method may operate.

For example, the drone formation control apparatus may be mounted only in the master drone which is determined in advance to operate as a master drone among the plurality of drones 1 to 5.

Now, a method of transmitting and receiving information between the plurality of drones 1 to 5 and the drone formation control apparatus 100 through the above-described drone control network 20 will be described. However, the present disclosure is not limited thereto.

The plurality of drones 1 to 5 and/or the drone formation control apparatus 100 belonging to the drone control network 20 may exchange information therebetween through the above-described drone control network 20. In order to control the drone formation, a method for obtaining or providing additional information may be necessary.

For example, the plurality of drones 1 to 5 and/or the drone formation control apparatus 100 may have a function of transmitting or receiving information through communication or a network. Therefore, the plurality of drones 1 to 5 and/or the drone formation control apparatus 100 may request or transmit information by utilizing the function.

For example, the plurality of drones 1 to 5 and/or the drone formation control apparatus 100 included in the drone control network 20 may operate such that when a request status packet is transmitted, the plurality of drones 1 to 5 and/or the drone formation control apparatus 100 transmit a response status packet. However, the present disclosure is not limited thereto.

According to an example, the request status packet may include a configuration of the following Table 1.

TABLE 1

| Sequence | Packet No. (for checking out-of-order packet) |
|---|---|
| Packet Type | Request_Status |

According to an example, the response status packet may include a configuration of the following Table 2.

TABLE 2

| Sequence | Packet No. (same as packet No. of Request) |
|---|---|
| Packet Type | Response-Status |
| Location | GPS based current location |
| Flight Status | Flight status (mode/speed/battery) |

In this case, in order to transmit the above-described drone movement command to at least one drone of the plurality of drones 1 to 5, the drone formation control apparatus 100 may generate a request move packet to transmit the request move packet. However, the present disclosure is not limited thereto.

Now, a method of processing a drone movement command received by the plurality of drones 1 to 5 will be described.

When the plurality of drones 1 to 5 receives the above-described drone movement command from the drone formation control apparatus 100, a drone movement command which is previously generated is transmitted late or a drone movement command which is generated later is transmitted earlier in some cases.

In this case, the drone movement command which is transmitted late may not be used in the plurality of drones 1 to 5. The plurality of drones 1 to 5 compares a transmission time recorded in a packet of the drone movement command which is received most recently and a transmission time recorded in a packet which is previously received last by utilizing a transmission time recorded in a packet where the drone movement command is received to utilize only the drone movement command which is finally generated. However, the present disclosure is not limited thereto.

According to an example, the drone movement command which is transmitted to each of the plurality of drones 1 to 5 may include a command for moving to a specific GPS location based on an earth coordinate system, a drone heading based command for moving to a designated relative location from the current drone location, and a GPS based movement command for moving to a designated relative location from the current drone location. However, the present disclosure is not limited thereto.

Now, a drone formation control method will be described with reference to FIG. 7.

FIG. 7 is a flowchart for explaining a drone formation control method.

As illustrated in FIG. 7, a drone formation control method includes a step S710 of receiving a drone control command, a step S720 of generating a drone movement command, and a step S730 of transmitting a drone movement command.

For example, the drone formation control method may refer to a drone formation control method which controls a drone formation utilizing a drone formation control apparatus for controlling a plurality of drones included in a drone formation.

In step S710, an input unit 110 receives a drone control command which is a command for controlling a plurality of drones together.

In step S720, a movement command generating unit 120 generates a drone movement command which is a command for moving the plurality of drones to a specific destination based on the drone control command.

In step S730, a movement command transmitting unit 130 transmits the drone movement command to at least one of the plurality of drones.

Even though not illustrated in the drawing, the drone formation control method may further include a step of generating a drone control network which is a network which includes a plurality of drones and controls the plurality of drones by a network generating unit 140.

Even though not illustrated in the drawing, the drone formation control method may further include a step of determining at least one drone among the plurality of drones included in the drone control network as a master drone based on a predetermined criteria by a master drone determining unit 150.

In this case, more detailed description of the drone formation control method according to the exemplary embodiment of the present disclosure is the same as described for the drone formation control apparatus 100 so that a redundant description will be omitted.

Although the exemplary embodiment of the present disclosure has been described, it is understood that the present disclosure will be changed in various forms and those skilled in the art may carry out various variations and modifications without departing the claim of the present disclosure.

What is claimed is:

1. A drone formation control apparatus for controlling a plurality of drones included in a drone formation, the apparatus comprising:
    an input unit which receives a drone control command, the drone control command being a command for controlling the plurality of drones together and including first information on a flying direction of the plurality of drones and second information on a rotational amount of the drone formation;
    a movement command generating unit which generates a drone movement command based on the first and second information of the drone control command, the drone movement command being a command for moving the plurality of drones to a specific destination and including an individual destination coordinate which is a coordinate of each of the plurality of drones corresponding to the specific destination; and
    a movement command transmitting unit which transmits the drone movement command to at least one drone of the plurality of drones.

2. The drone formation control apparatus according to claim 1, wherein the input unit receives the drone control command from an external RC controller and the movement command transmitting unit relays the drone control command to each of the plurality of drones.

3. The drone formation control apparatus according to claim 1, further comprising:
    a network generating unit which generates a drone control network which includes the plurality of drones and controls the plurality of drones.

4. The drone formation control apparatus according to claim 3, wherein the movement command generating unit generates the drone movement command further based on a current coordinate of each of the plurality of drones received through the drone control network and the movement command transmitting unit transmits the drone movement command to each of the plurality of drones.

5. The drone formation control apparatus according to claim 4, wherein the individual destination coordinates are calculated based on a current representative coordinate $(x_{center}^{init}, y_{center}^{init}, z_{center}^{init})$ of the drone formation determined according to the predetermined criteria, an x-axis variation $x^{diff}$ of the representative coordinate of the drone formation to move to the specific destination, a y-axis variation $y^{diff}$ of the representative coordinate of the drone formation to move to the specific destination, a z-axis variation $z^{diff}$ of the representative coordinate of the drone formation to move to the specific destination, a rotational amount $\theta^{diff}$ of the drone formation to move to the specific destination, and a current relative coordinate $(x_i^{rel}, y_i^{rel}, z_i^{rel})$ of each of the plurality of drones with respect to the current representative coordinate of the drone formation.

6. The drone formation control apparatus according to claim 4, wherein the individual destination coordinate is calculated based on the following Equation 7:

$$x_i^{dest} = x_{center}^{init} + x^{diff} + (x_i^{rel} \cdot \cos(\theta^{diff}) + y_i^{rel} \cdot \sin(\theta^{diff}))$$

$$y_i^{dest} = y_{center}^{init} + y^{diff} + (x_i^{rel} \cdot \sin(\theta^{diff}) + y_i^{rel} \cdot \cos(\theta^{diff}))$$

$$z_i^{dest} = z_{center}^{init} + z^{diff} + z_i^{rel} \quad \text{[Equation 7]}$$

wherein, $(x_i^{dest}, y_i^{dest}, z_i^{dest})$ is the individual destination coordinate of an i-th drone included in the drone formation and $(x_{center}^{init}, y_{center}^{init}, z_{center}^{init})$ is a current representative coordinate of the drone formation determined according to a predetermined criteria, $x^{diff}$ is an x-axis variation of the representative coordinate of the drone formation to move to the specific destination, $y^{diff}$ is a y-axis variation of the representative coordinate of the drone formation to move to the specific destination, $z^{diff}$ is a z-axis variation of the representative coordinate of the drone formation to move to the specific destination, $\theta^{diff}$ is a rotational amount of the drone formation to move to the specific destination, and $(x_i^{rel}, y_i^{rel}, z_i^{rel})$ means a current relative coordinate of the i-th drone with respect to the current representative coordinate of the drone formation.

7. The drone formation control apparatus according to claim 3, further comprising:
    a master drone determining unit which determines at least one drone among the plurality of drones included in the drone control network as a master drone, based on a predetermined criteria.

8. The drone formation control apparatus according to claim 7, wherein
    the movement command generating unit generates the drone movement command further based on a current coordinate of each of the plurality of drones received through the drone control network,
    the movement command transmitting unit transmits the drone movement command to the master drone, and
    the master drone transmits the drone movement command to each of the remaining drones excluding the master drone among the plurality of drones included in the drone control network.

9. The drone formation control apparatus according to claim 7, wherein the master drone determining unit determines at least one drone of a drone having a broadest communication range among the plurality of drones, a drone having a longest remaining flight time among the plurality of drones, a drone which may be capable of using the most communication resources among the plurality of drones, and a drone which is the closest to a center of the drone formation among the plurality of drones as the master drone.

10. The drone formation control apparatus according to claim 7, wherein the drone formation control apparatus is mounted in the master drone.

11. A drone formation control method for controlling a drone formation by utilizing a drone formation control apparatus which controls a plurality of drones included in a drone formation, the method, comprising:

receiving a drone control command which is a command for controlling the plurality of drones together and includes first information on a flying direction of the plurality of drones and second information on a rotational amount of the drone formation, by an input unit;

generating a drone movement command which is a command for moving the plurality of drones to a specific destination and includes an individual destination coordinate which is a coordinate of each of the plurality of drones corresponding to the specific destination, based on the first and second information of the drone control command, by a movement command generating unit; and transmitting the drone movement command to at least one drone of the plurality of drones, by a movement command transmitting unit.

12. The drone formation control method according to claim 11, further comprising:

generating a drone control network which includes the plurality of drones and controls the plurality of drones, by a network generating unit.

13. The drone formation control method according to claim 12, further comprising:

determining at least one drone among the plurality of drones included in the drone control network as a master drone, based on a predetermined criteria, by a master drone determining unit.

* * * * *